United States Patent [19]
Tanigawa et al.

[11] Patent Number: 5,915,033
[45] Date of Patent: Jun. 22, 1999

[54] METHOD FOR CORRECTING DETECTED DISTANCE VALUES

[75] Inventors: Taichi Tanigawa; Hideo Shimizu; Takehide Hirabayashi, all of Tokyo; Akio Izumi, Nagano, all of Japan

[73] Assignee: Fuji Electric Co., Ltd., Kawasaki, Japan

[21] Appl. No.: 08/929,421

[22] Filed: Sep. 15, 1997

[30] Foreign Application Priority Data

Sep. 26, 1996 [JP] Japan ..................................... 8-254037

[51] Int. Cl.$^6$ ................................. G06K 9/62; G06K 9/78
[52] U.S. Cl. ......................... 382/106; 382/154; 356/3.14; 348/349; 396/128
[58] Field of Search ..................................... 382/106, 154; 356/3, 3.14, 12; 348/42, 47, 349, 351; 396/128

[56] References Cited

U.S. PATENT DOCUMENTS

| | | | |
|---|---|---|---|
| 4,668,084 | 5/1987 | Suzuki et al. | 356/3.14 |
| 5,093,562 | 3/1992 | Okisu et al. | 396/128 |
| 5,165,108 | 11/1992 | Asayama | 340/435 |
| 5,193,124 | 3/1993 | Subbarao | 356/3 |
| 5,202,555 | 4/1993 | Ishida et al. | 396/111 |
| 5,227,890 | 7/1993 | Dowski, Jr. | 396/125 |
| 5,357,310 | 10/1994 | Kawamura et al. | 356/3.14 |
| 5,530,514 | 6/1996 | Lisson et al. | 396/128 |
| 5,557,323 | 9/1996 | Kajiwara | 382/103 |
| 5,563,677 | 10/1996 | Muramatsu et al. | 396/121 |
| 5,577,130 | 11/1996 | Wu | 382/106 |
| 5,586,063 | 12/1996 | Hardin et al. | 382/106 |
| 5,592,254 | 1/1997 | Uchiyama | 396/96 |
| 5,602,944 | 2/1997 | Yokoyama et al. | 396/128 |
| 5,612,763 | 3/1997 | Uchiyama | 396/126 |
| 5,682,198 | 10/1997 | Katayama et al. | 348/47 |
| 5,692,227 | 11/1997 | Yokota et al. | 396/377 |
| 5,715,043 | 2/1998 | Hasegawa et al. | 356/3.14 |

*Primary Examiner*—Jon Chang
*Assistant Examiner*—Mehrdad Dastouri
*Attorney, Agent, or Firm*—Kanesaka & Takeuchi

[57] ABSTRACT

A method of the invention corrects a detection error, caused by an assembly error, in a distance or a distance-related index detected from an image captured in the visual field of an image detection module including an optical device and a pair of image sensing devices, each including a plurality of image sensors. In the method, the visual field is divided into windows disposed in a two-dimensional matrix format in order to detect the distance or a parallax for a pair of images in each window; the characteristics of an error is expressed in a detected value caused by an angle error in the assembly of the image detection module, as a quadratic polynomial for two angle variables indicating the position of the window within the visual field; parallax for a plurality of windows is detected after a test sample image has been provided to the module; the coefficient value for each term in the polynomial is determined based on the results of the detection, and these values are stored in a storage device; and, when using the image detection module to detect actual distances, the detected value for each window is corrected by adding to it the value of the polynomial to which the stored values of the coefficients and the values of the variables indicating the position of the window are applied.

7 Claims, 3 Drawing Sheets

METHOD FOR CORRECTING DETECTED DISTANCE VALUES

BACKGROUND OF THE INVENTION AND RELATED ART STATEMENT

The present invention relates to a method for preventing collisions between vehicles by correcting a possible error in the results of a detected distance, or a distance-related index value, detected from an image within the visual field of an image detection module including a pair of image sensing devices, each of which includes a plurality of image sensors as well as an optical means, wherein the error is caused by improper assembly of the image detection module.

Various techniques have previously been developed for accurately detecting the distance to a target as a subject, based on the parallax between a pair of images of the target captured by a pair of image sensors.

The conventional distance detection methods using this principle of triangulation are characterized by their passive nature, and have been used in auto-focusing cameras. These methods are now being applied in preventing collisions between vehicles.

In the above-noted triangulation technique, a module including a pair of image sensors and an optical device, such as a lens, is used to detect the images of a target. In applications involving auto-focusing cameras, however, these methods are guaranteed to identify a detection target through a finder, while in applications involving the prevention of a collision, the target may not always be located in front of the module, e.g., a preceding vehicle may be located at an unspecified lateral angle and must first be found before the distance to it can be determined. Thus, a common package, as an image detection module including a pair of integrated circuit chips, each comprising a plurality of image sensors, and an optical device, is used, and the visual field used for capturing the images containing a target, is relatively larger than that in auto-focusing cameras. For example, the image sensor may be a CCD comprising several hundred or more optical sensors.

In such cases, in order to identify that region within the visual field in which a target to be detected exists, it is most practical to divide this wide visual field into a plurality of windows, or sub- visual-fields disposed in a two-dimensional matrix, to detect the parallax between the distances for a pair of images captured by the image sensors for each window, to select the most reliable range of the distance to the target based on a distribution of a plurality of detected distances, and to identify that region within the visual field in which the windows corresponding to this range are collected, as a region in which the target is present.

In order to divide the visual field produced by these multiple pairs of image sensors into windows disposed like a matrix, a plurality of windows may be set and disposed within the sub-visual-field of each pair of image sensors. To set a window, the window-part data corresponding to each window may be extracted from image data, including a multiplicity of sensor data, representing an image pattern captured by each image sensor in such a way that the window-part data includes several tens of sensor data items. To detect a parallax between the pair of images within a window, one pair of window-part data points may be shifted to each other while checking how they match, and when a match is detected, the corresponding shift value may be assumed to be a parallax expressed as a number of sensor data.

As is well known, when the parallax is referred to as σ and the array pitch of the optical sensors within an image sensor is referred to as (h), the distance (d) for the image in each window can be calculated using a simple equation "d=bf/hσ", wherein (b) is the base length in triangulation, which is the distance between the optical axes of a pair of lenses in the optical means which form an image on the pair of image sensors, and wherein (f) is their focal distance. In this equation, bf/h is a constant, and the parallax a is directly used as an index for the distance (d).

As described in the preceding section, a visual field may contain a region in which a target is present and the distance to the target can be detected from either direct detection of the distance (d), or from the parallax σ which is an index for each window formed by dividing the visual field produced by multiple pairs of image sensors. However, the incorporation of a pair of integrated circuit chips into the image detection module leads to unavoidable assembly errors involving the image sensors and the optical device, resulting in a small error in the image captured in each window. If there is an error in the image in each window, pairs of window-part data do not match. In this case, instead of checking the degree of coincidence between a pair, the correlations between them can be checked to assume the shift value when the best correlations is obtained as the parallax σ. In this case, however, an error unavoidably occurs in the value of the parallax σ obtained, or in the distance (d), depending on the position of the window within the visual field, as long as there is an error in the assembly of the module, thereby adversely affecting the accuracy of the estimated range to the target or the detected distance.

In view of the foregoing, it is an object of this invention to solve these problems and to correct detected values so as to consistently obtain an accurate parallax or the distance for each window set within the visual field, despite any error in the image detection module assembly.

SUMMARY OF THE INVENTION

Despite a similarity to the conventional technique, in that the visual field of an image detection module is divided into a plurality of windows disposed in a two-dimensional matrix, and in that the distance to the image in each window or the parallax between a pair of images captured by the pair of image sensors is detected for each window, in order to achieve the above-noted objectives, this invention:

notes that the error that may occur in a distance or parallax value due to module assembly error, varies in a close relationship to the position of the window within the visual field, and that an assembly error in a different part of the module may cause a similar error in the distance or parallax values, in order to collectively express the characteristics of the detection error for each window which is caused by assembly error, as a polynomial with two variables for the vertical and horizontal variables expressing the position of the window within the visual field;

detects distances for a plurality of windows within the visual field after a test sample image disposed at a specified distance to determine the coefficients of variables in the polynomial (which vary by module) has been provided to the image detection module, and determines the coefficient of each term of the polynomial representing a characteristic error based on the results of the detection in order to store these coefficients in a storage device; and when using the module to actually detect distances or parallax, corrects the detected value for each window within the visual field, by adding to or subtracting from the detected value, the value of the polynomial representing a characteristic error to which the stored coefficient values and the vertical and horizontal variable values for the window are applied, thereby almost completely eliminating the effect of module assembly error, if any, and to provide a consistently accurate technique for detecting the distance or parallax for the image in each window.

The use of the polynomial as a characteristic function for an error in distance or parallax values for individual window images, depends on the types of possible module assembly errors which may be present. As a practical matter, however, it is normally sufficient to use a polynomial of order two or smaller, and which relates to the vertical and horizontal variables indicating the position of the window. A sample used to test the module should therefore have a uniform repeating pattern, such as vertical stripes. By detecting, during the test of each module, distances or parallax for a plurality of, for example, several tens of windows symmetrically distributed relative to the center of the visual field, the results of the detection effort can be combined as appropriate, to determine with relative ease and sufficient accuracy, the coefficient of each variable in the polynomial representing a characteristic error function.

BRIEF DESCRIPTION OF THE DRAWINGS

FIGS. 1(a)–1(c) show an example of the configuration of an image detection module according to this invention as well as its visual field, in particular, wherein FIG. 1(a) is a perspective view showing the configuration of the image detection module; FIG. 1(b) is a circuit diagram showing an example of the configuration of a distance detection circuit and a correction means; and FIG. 1(c) is an image drawing showing the positions of typical windows within the visual field of the image detection field;

DETAILED DESCRIPTION OF PREFERRED EMBODIMENTS

Figure 1A:
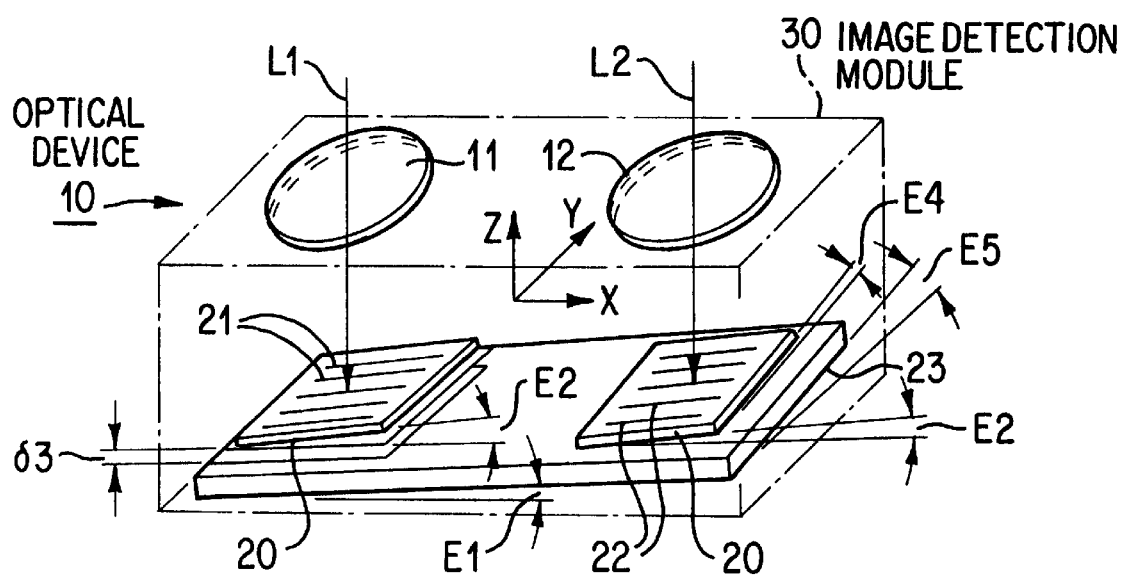

In FIG. 1(a), the rectangular-parallelopipedic outline of an image detection module 30 is shown by using broken lines. As shown in this Figure, the module 30 includes, in a conventional package, a pair of lenses 11 and 12 constituting an optical device 10, and a pair of image sensing devices 20 corresponding to these lenses. Each image sensing device 20 is an integrated circuit chip on which several tens of image sensors 21 or 22, are provided and are preferably CCDs which receive light L1 or L2 through the lens 11 or 12, respectively. The image sensing devices 20 are mounted on a substrate 23, which is enclosed in the package of module 30. In FIG. 1(a), three coordinate axes x, y, and z are shown in conjunction with the module 30, the function of which is described below in more detail.

Figure 1B:
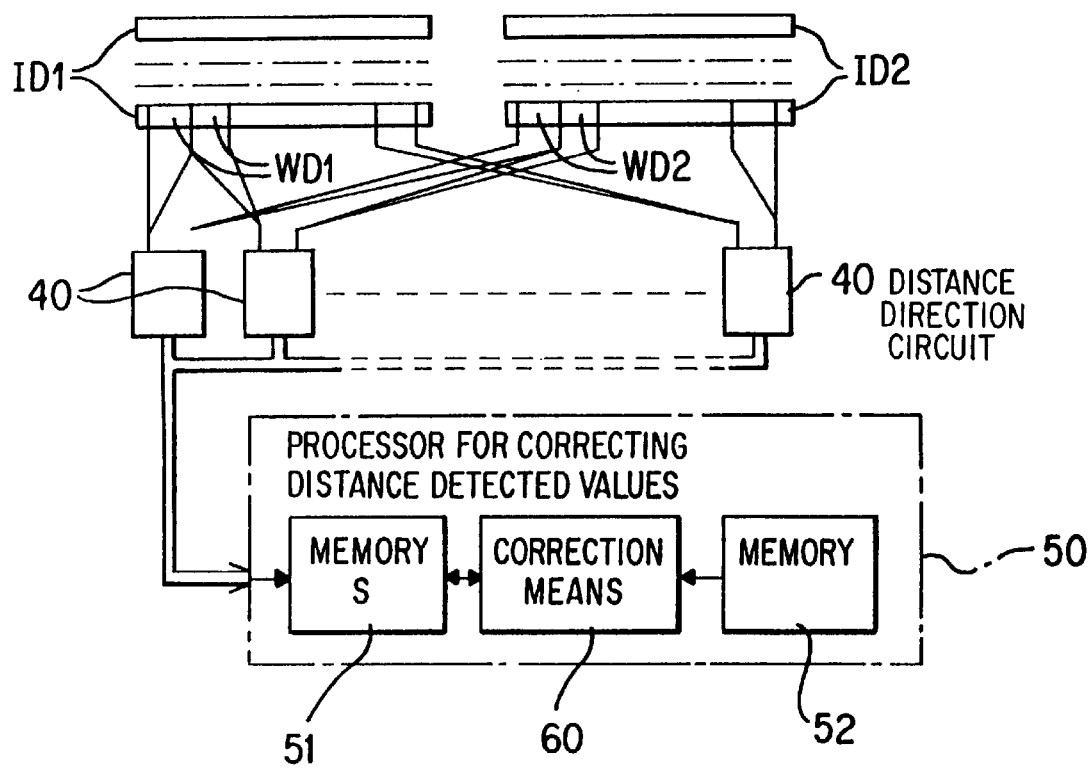

The upper part of FIG. 1(b) shows image data ID1 and ID2, each comprising several hundred units of sensor data for indicating an image pattern detected by image sensors 21 and 22. One or more distance detection circuits 40 (only two are shown for clarity in FIG. 1(b)), shown below and corresponding to the pair of image data ID1 and ID2, obtain window-part data WD1 and WD2 from the image data ID1 and ID2, respectively, as shown by the thin line in the Figure, to divide the sub-visual-field of each pair of image sensors into a plurality of windows, and to detect from the pair of window-part data WD1 and WD2, the parallax σ between the pair of images as an index of the distance for the image in the relevant window, according to the method of this invention.

Each distance detection circuit 40 sequentially checks the correlations between the window-part data WD1 and WD2, which are obtained by gradually and relatively shifting the data, as in the prior art, and determines as a parallax the shift value at which the best correlation is obtained. Since, this correlations check requires some time, the detection circuits 40 are preferably incorporated in a single semiconductor integrated circuit so as to concurrently detect the parallaxes σ for the relative windows, thereby maximizing detection speed. The semiconductor integrated circuit is preferably a gate array that can be configured as a circuit adapted for each application.

Figure 2:
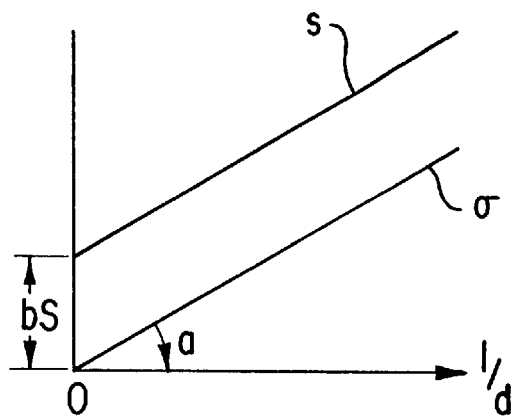
FIG. 2 is a chart showing the inclination of parallax as an example of a target to be corrected according to this invention, as well as a bias for the parallax.

The parallax detected by the distance detection circuit 40 is a calculated value obtained by superposing a predetermined bias on the actual parallax σ for a pair of images in each window. This is described with reference to the chart in FIG. 2. As described above, the parallax σ is a reciprocal of the distance (d) for the image, σ=a (1/d), wherein (a) is a proportional coefficient. Thus, the parallax σ is represented as a straight line with a slope (a) relative to a variable 1/d that is a reciprocal of the distance in the horizontal axis, as shown in FIG. 2. When the distance (d) is infinite and the variable 1/d is 0, the parallax σ is also 0, but if the parallax σ becomes negative for any reason, such as a detection error, it makes subsequent data processing difficult. Thus, the distance detection circuit 40 conveniently detects a calculated parallax (s) obtained by superposing a predetermined bias bs on the parallax σ. The bias bs represents a shift value at a point at infinity used in detecting the parallax.

In order to allow the distance detection circuit 40 to detect the calculated parallax (s), a reference point, which is used to check the correlations between the window-part data WD1 and WD2 while sequentially shifting them, may simply be offset from its original position at the beginning of the detection process. The calculated parallax (s) obtained in this manner is loaded in a memory 51 in a processor 50 (FIG. 1(b)), which is a microcomputer for correcting detected values according to this invention.

If there is an assembly error in image detection module 30, an error occurs in the parallax σ and in the slope (a) in FIG. 2. In this method, however, the distance detection circuit 40 detects the calculated parallax (s), so the error occurring in the parallax σ is considered to occur in the bias bs in the calculated parallax (s) and the values of the slope (a) and the bias bs are corrected according to this invention.

Although in some cases, the value of the slope (a) or the bias (bs) is not affected by an assembly error in the image detection module 30, FIG. 1(a) shows six types of assembly errors that can affect these values if the module 30 has the configuration shown in the Figure. A first error is $\epsilon_1$ in the angle of the substrate 23 for the image sensing device 20 about the Y axis when mounted in the module 30; a second error is $\epsilon_2$ in the angle of one of the image sensing devices 20 about the Y axis relative to the other image device 20 when mounted on the substrate 23; a third error is the offset $\delta_3$ of the mounting position of one of the image sensing devices 20 in the direction of the Z axis; a fifth error is $\epsilon_5$ in the mounting angle of the substrate 23 about the X axis; a fourth error is $\epsilon_4$ in the mounting angle of one of the image sensing devices 20 about the X axis; and a sixth error is $\epsilon_6$ in the mounting angle of one of the sensing devices 20 about the Z axis.

Such assembly errors cause detection errors $\Delta a$ and $\Delta bs$ in the values of the slope (a) and bias bs detected by the distance detection circuit 40 depending on the type of the assembly error. Since a description of the occurrence of the detection errors $\Delta a$ and $\Delta bs$ for all six types of assembly errors, is very complex, a procedure for evaluating how the detection errors $\Delta a$ and $\Delta bs$ are caused by the first error in the angle $\epsilon_1$ is explained with reference to the chart in FIG. 3.

Figure 3:
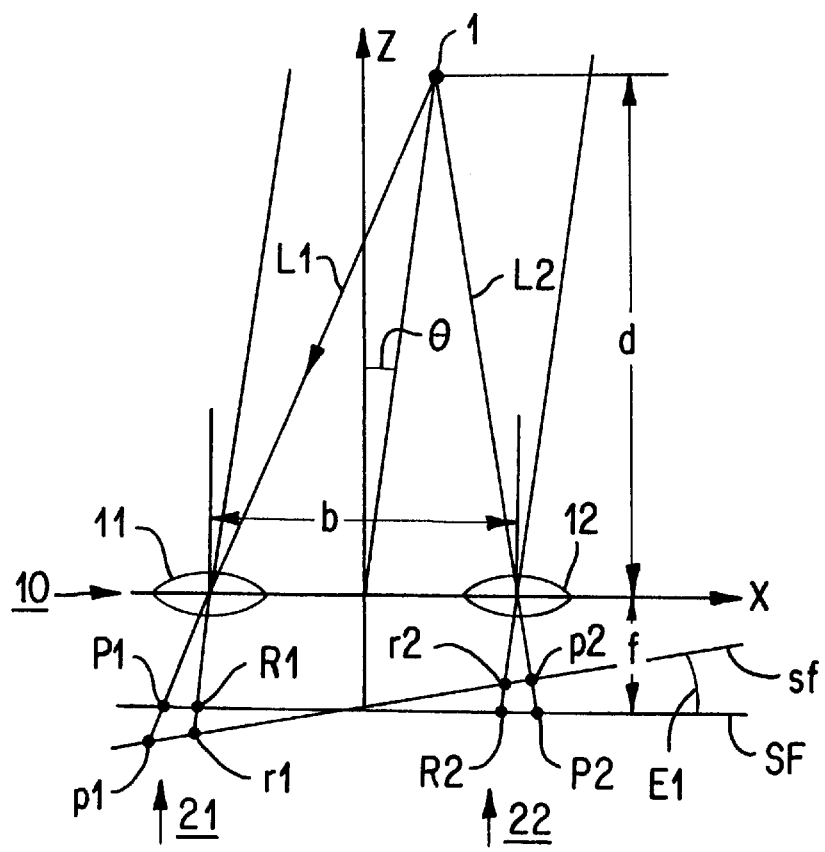
FIG. 3 is a chart showing the relationship among image forming points on a pair of image sensors which are formed by a point light source representing the windows and a pair of lenses, and illustrates an example of the relationship between an error in a detected value and an error in the assembly of the image detection module.

A point light source 1, shown in the upper part of FIG. 3, indicates the center of a particular window within the visual field of the image detection module 30. The point light source 1 is located at a distance (d) from the optical device 10 in the direction at an angle $\theta$ from the Z axis located in front of the image detection module 30 and at an angle $\phi$ (not shown) from a plane xz, but the angle $\phi$ is not considered for simplification. The lenses 11 and 12 of the optical device 10 receive light L1 and L2 from the point light source 1 to form an image on the light receiving surface of the corresponding image sensors 21 and 22. When there is no error in the assembly of the image detection module 30, a light receiving surface SF lies in a plane parallel to the X axis at a focal distance (f) from the lenses 11 and 12. When there is a mounting angle error $\epsilon_1$, however, the light receiving surface sf is inclined at the same angle $\epsilon_1$ from the X axis as shown in FIG. 3.

The positions at which an image of the point light source 1 is formed by the lenses 11 and 12, are referred to as P1 and P2 for the light receiving surface SF, and p1 and p2 for the light receiving surface sf. The intersections of two straight lines extending at the angle $\theta$ from the optical axes of the lenses 11 and 12 with the light receiving surface SF, are referred to as R1 and R2; those for the light receiving surface sf, as r1 and r2. The latter intersections are the reference points used to detect the parallax $\sigma$, but in this method, since the detection circuit 40 detects the calculated parallax (s) including the bias bs, detection is carried out by using as reference points those points on the light receiving surface SF, or sf which are inwardly offset from the pair of intersections R1 and R2 or r1 and r2 by a distance equal to bs/2 optical sensors.

If the distance between the points P1 and R1 is D1, and the distance between the points p1 and r1 is d1, the distance between the points P2 and R2 is D2, and the distance between the points p2 and r2 is d2, then the sum of the two distances D1+D2 is the parallax if there is no angle error $\epsilon_1$; if there is an angle error $\epsilon_1$, the parallax is the sum of the two distances d1+d2. Since the slope (a), shown in FIG. 2, is a proportional coefficient of the parallax relative to the reciprocal of the distance (d), an error that may occur in the slope (a) due to the angle error $\epsilon_1$ can be expressed by $\Delta a = (d1+d2)-(D1+D2)$. The right side of this equation is complicated due to the use of a trigonometric function with the distance (d), base length (b), focal length (f), angle $\theta$, and angle error $\epsilon_1$, but it can be accurately expressed.

Since, the actual angle $\theta$ and angle error $\epsilon_1$ are relatively small, the error $\Delta a$ is conveniently expressed in practice using an approximate expression. Under this approximation, the error $\Delta a$ with the slope (a) can be expressed by the following simple equation:

$$\Delta a = 2(bf/h)\epsilon_1 \theta$$

When the distance (d) is assumed to be a parallax $\sigma$, expressed as the number of optical sensors, $d=bf/h\sigma$, as described above, so $\sigma=(bf/h)(1/d)$, so that the slope (a) in FIG. 2 can be expressed as $a=bf/h$. By assigning this to the above equation, the following equation is established:

$$\Delta a = 2a\epsilon_1\theta$$

However, an error in the parallax $\sigma$ occurs because the detection (reference) points R1 and R2 change to the points r1 and r2 due to the angle error $\epsilon_1$. Thus, when the distance between the points R1 and R2 is D12, and the distance between the points r1 and r2 is d12, the error $\Delta bs$ for the bias bs can be expressed as $(d12-D12)/h$ according to this invention. The distance D12 is equal to the base length (b), and the distance d12 can be expressed as (b) $\cos\theta/\cos(\theta+\epsilon_1)$ based on geometrical calculations, so the error $\Delta bs$ can be simply expressed as follows by determining the difference between D12 and d12 and assuming that both angle $\theta$ and angle error $\epsilon_1$ are small.

$$\Delta bs = b\epsilon_1\theta$$

The equation for the error $\Delta a$ for the slope (a) and the equation for the error $\Delta bs$ for the bias bs indicate that neither error relates to the distance (d) to the target 1.

Likewise, the error $\Delta a$ for the slope (a) and the error $\Delta bs$ for the bias bs can be calculated for the second and subsequent assembly errors. The details of this calculation are omitted, but the relevant results can be shown for the six types of assembly errors as follows:

Angle error $\epsilon_1$, $\Delta a = 2a\epsilon_1\theta$, $\Delta bs = b\epsilon_1\theta$ Angle error $\epsilon_2$, $\Delta a = a\epsilon_1\theta$, $\Delta bs = f\epsilon_1\theta^2$ Offset $\delta_3$, $\Delta a = b\,\delta_3/2$, $\Delta bs = \delta_3\theta$ Angle error $\epsilon_4$, $\Delta a = a\epsilon_4\phi$, $\Delta bs = 0$ Angle error $\epsilon_5$, $\Delta a = a\,\epsilon_5\phi$, $\Delta bs = f\epsilon_5\theta\phi$ Angle error $\epsilon_6$, $\Delta a = 0$, $\Delta bs = f\epsilon_6\phi$)

In these equations, the angle $\theta$ is the angle in the plane xz of the window corresponding to the point light source 1 relative to the front of image detection module 30, and the angle $\phi$ is the angle between the direction of the point light source and the plane xz.

Figure 1C:
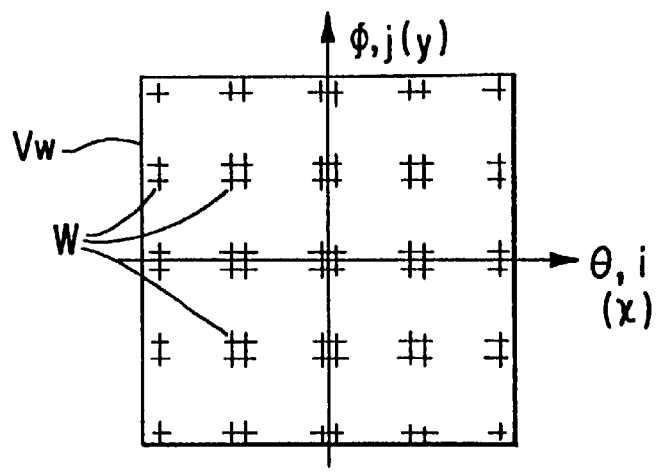

As is apparent from the above description, for any assembly error, the errors $\Delta a$ or $\Delta bs$ in the detected values of the slope (a) or the bias bs have no relation to the distance (d). This invention uses this characteristic to correct the detected value for each window depending only on the two angle variables $\theta$ and $\phi$, indicating the position of the window within the visual field. FIG. 1(c) shows from a typical direction for windows W, how the windows W are disposed in a two-dimensional matrix within a visual field Vw with a square outline of the image detection module 30. In this Figure, the two variables $\theta$ and $\phi$ are shown as coordinate axis variables corresponding to the X and the Y axes with the center of the visual field Vw set as the origin.

This invention, therefore, expresses the characteristics of the error $\Delta a$ or $\Delta bs$ in the detected value for each window W within the visual field Vw, with respect to the assembly error $\epsilon_1$, as a polynomial with two variables for the two angle variables $\theta$ and $\phi$ indicating the position of the window. First, a characteristic function fn for the error $\Delta a$ in the slope (a) is expressed as follows:

$$fn = p + q\theta + r\phi$$

The relationship between the coefficients p, q, and r in this polynomial and the assembly error, however, is as follows:

$$p=b\delta_3/2, q=2a\epsilon_1+a\epsilon_2, r=a\epsilon_4+a\epsilon_5$$

Next, a characteristic function Fn for the error Δbs in the bias bs is expressed as follows:

$$Fn=P\theta+Q\theta^2+R\phi+S\theta\phi$$

The coefficients P, Q, R, and S in this polynomial, however, are as follows.

$$P=b\epsilon_1+\delta_3, Q=f\epsilon_2, R=f\epsilon_6, S=f\epsilon_1$$

According to this invention, the characteristic function for the error in detected values is preferably expressed by using a polynomial of order 2 or smaller.

Once the coefficients in the polynomial for the characteristic function fn or Fn have been determined, the detected value for each window W within the visual field Vw can be corrected; however, it is not practical (and is very difficult) to measure the assembly error $\epsilon_1$ from this. Thus, this invention provides a sample image for testing purposes which is disposed at a predetermined distance to the assembled image detection module 30, in order to detect the distance corresponding to the image for a plurality of windows W within Vw (in this method, the calculated parallax (s)), and then determines the values of the coefficients in the polynomial representing a characteristic error from the detection result. The test sample should have uniform repeating pattern such as vertical stripes, and its distance to the image detection module 30 need not be strictly specified.

When the coefficients of the polynomial representing an error function were determined for an actual image detection module 30, it was found that the coefficients in the polynomial for the characteristic error function fn for the slope (a), were very small and that the error Δa could be practically overlooked. In addition, as long as the distance for the image in each window W is detected as the parallax σ or the calculated parallax (s), the error Δa in the slope (a) need not be determined. Thus, procedures for determining the coefficients in a polynomial expressing the error Δbs in the bias bs, and for using the characteristic function Fn to correct the detected value of the parallax (s), are described below.

In testing the image detection module 30, the parallax (s) should be detected for a plurality of (in the illustrated example, 25) typical windows W symmetrically distributed relative to the center of the visual field Vw, as shown in FIG. 1(c). In addition, numerical variables (i) and (j) that vary in both the positive and negative directions are conveniently used, instead of the angle variables θ and φ as coordinates indicating the position of the window W within the visual field Vw. The error characteristic function Fn can be expressed as follows by using the variables (i) and (j):

$$Fn=Pi+Qi^2+Rj+Sij$$

The coefficient P in this polynomial is expressed by using the same symbols as in the previous equations for convenience. In addition, the numerical variables (i) and (j) are of course integers and vary between −2 and +2, in the example with the 25 windows W shown in FIG. 1(c).

Strictly speaking, in order to calculate four coefficients in the polynomial Fn based on the parallax (s) detected for 25 windows W, the least squares method should be used. A procedure for determining the coefficients more simply, however, is described below. First, the parallax (s) detected for the 25 windows W is averaged to determine the difference As between this average and the value of each parallax (s). Since the 25 windows W are symmetrically distributed relative to the center of the visual field Vw and the number variables (i) and () vary symmetrically relative to zero, the sum Σ Fn of the polynomials Fn with integral values within the above range assigned to the variables (i) and (j) is determined through simple calculation to be 50Q, because the coefficients other than Q, the coefficient of $i^2$, are zero. Consequently, by calculating ΣΔs corresponding to the sum of the errors Δs which correspond to the above value, the coefficient Q can be determined quite simply from the equation Q=ΣΔs/50. The sum ΣFn of the polynomials for four windows W located diagonally upper right and diagonally lower left relative to the center of the visual field Vw is 20Q+18S, because only the coefficient Q of $i^2$ and the coefficient S of ij remain. The value of the coefficient S of the variable ij can be easily calculated from the sum ΣΔs of the parallax (s) corresponding to the above value and the known value of the coefficient Q.

The coefficient P of (i), or the coefficient R of (j), in the polynomial Fn can be similarly calculated by forming appropriate combinations in which the values of the coefficients P to S in the polynomial Fn for a characteristic error function are extracted from a plurality of detected values for typical windows W symmetrically distributed within the visual field Vw. The values of the coefficients P to S for the variables in the polynomial Fn representing a characteristic error, which have been determined in the above manner, are permanently stored as values unique to each image detection module 30. The storage takes place, for example, in a PROM as the storage means 52 in the processor 50 in FIG. 1(b), so that the values can be used as required to correct distance detected values according to the present method. Since the coefficients obtained, as described above, correspond to the variables (i) and (j) indicating the position of a typical window, they should be translated prior to storage into values suitable to the numerical variables (i) and (j) that can specify all the window positions within the visual field Vw.

Once the values of the coefficients P to S in the polynomial Fn for a characteristic error function have been calculated and stored as described above, the calculated parallax (s) for each window W output from the distance detection circuit 40 for an actual image captured within the visual field Vw of the image detection module 30 can be accurately corrected by using the values stored in the storage device 52. To do this a correction device 60 in the form of a software is loaded into the processor 50, as shown in FIG. 1(b). The processor 50 calculates the error Δbs used to provide a correction for each window W by applying to the polynomial Fn the values of the coefficients P to S read out from the storage device 52, and the values of the number variables (i) and (j) for the window, and then corrects a detected value of an actual image by adding or subtracting the error Δbs to or from the value. The processor 50 corrects the parallax σ as an index for a distance using the following equation:

$$\sigma=s^-(bs+\Delta bs)$$

Once the error Δa in the slope (a) has been determined, a detected value of the distance (d) can be corrected to a very accurate value by using the corrected parallax σ as described above:

$$d=(a+\Delta a)/\sigma$$

As described above, however, the error Δa can be overlooked without causing any problem, so the distance can be simply calculated as d=a/σ.

Although, in the method described above, the structure of the image detection module 30 is as shown in FIG. 1(a), different assembly errors occur in different module structures, and in such a case, different forms of the polynomial Fn or fn indicating a characteristic error must be used.

The method for correcting the detected distance values according to this invention divides the visual field of the image detection module into a plurality of windows disposed in a matrix-like form so as to detect the distance corresponding to the image in each window based on its parallax; expresses the characteristics of an error in the distance detected for each window, which is caused by an error in the assembly of the module, as a polynomial with two variables for a vertical and a horizontal variable indicating the position of the window within the visual field; detects distances or parallax for a plurality of windows after a test sample image disposed at a specified distance is provided to the module; determines the coefficient value of each term in a polynomial based on the results of the detection to store these values in the storage device; and when using this module to detect actual distances or parallax, corrects the detected value for each window by adding to or subtracting from the detected value, the value of the polynomial with two variables to which the stored values of the coefficients and the values of two variables indicating the position of the window are applied.

Thus the invention has the following advantages:

Corrections can be executed so as to almost completely eliminate the effects of any assembly error in the image detection module, thus guaranteeing the accuracy of the detected distance or parallax values for all the windows within the visual field.

Using the fact that an error in a detected value caused by module assembly error has no relation to distance and varies depending only on the position of the window within the visual field, this invention therefore expresses a characteristic error function for correction, as a polynomial with two variables for two variables indicating the position of the window within the visual field. Thus, the coefficient of each term in the polynomial can be easily determined from the results of a simple test in order to accurately correct distance detected values.

The value of the coefficient of each term, which is different for each module, in the polynomial used to correct errors in detected values caused by assembly error, is determined based on the results of a test in which a sample test image is provided to each image detection module. Thus, an appropriate correction for each module can be provided to the detected value without measuring any actual assembly error.

The method of this invention using the parallax as an index for the distance and a polynomial of order 2 or smaller for a characteristic error function, is advantageous in that a correction can be easily and accurately provided to the detected value for each window within the visual field. The method of detecting distances for a plurality of windows symmetrically distributed relative to the center of the visual field during the test of the module, and based on the results of the detection for an appropriate pair of windows, determining the value of the coefficient of each term in the polynomial representing a characteristic error, is advantageous in that it allows the test to be conducted and the coefficients determined with relative ease and simplicity.

What is claimed is:

1. A method for correcting a distance-related index value detected from an image within a visual field and captured by an image detection module having the visual field and including a pair of image sensing means, each of the image sensing means including a plurality of image sensors and an optical means, comprising the steps of:

dividing the visual field of said image detection module into a plurality of windows to detect a distance for each window based on a parallax between a pair of images within each window captured by said image sensors;

expressing a characteristic function for an error in the detected distance for each window as a polynomial with two variables for a first and a second variable defining a position of the window within the visual field;

detecting distances for a plurality of the windows within the visual field by providing a test sample image at a specified distance to the image detection module;

determining, based on results of distance detection, a value of a coefficient for each term of the polynomial representing a characteristic error and storing the coefficient in storage means; and correcting, during actual distance detection, the detected value for each of the windows within the visual field by calculating from the detected value with respect to the value of the polynomial representing a characteristic error.

2. A method for correcting a distance-related index value according to claim 1, wherein the parallax between said pair of images in each window within the visual field is detected and used as an index for the detected distance for the window.

3. A method for correcting a distance-related index value according to claim 1, wherein the polynomial used as a characteristic function for error is a polynomial of order two or smaller.

4. A method for correcting a distance-related index value according to claim 1, wherein the test sample image used to test the image detection module, has a uniform repeat pattern.

5. A method for correcting a distance-related index value according to claim 1, further comprising the steps of:

detecting distances for a plurality of the windows symmetrically distributed relative to a center of the visual field when testing the image detection module; and determining a value for each coefficient of the polynomial with two variables representing a characteristic error based on a combination of data extracted from results of the detection.

6. A method for correcting a distance-related index value according to claim 1, wherein said first and second variables comprise vertical and horizontal variables, respectively.

7. A method for correcting a distance-related index value according to claim 1, wherein the coefficient value for each term of the polynomial stored in said storage means and said first and second variables are applied to the polynomial for representing a characteristic error.

* * * * *

UNITED STATES PATENT AND TRADEMARK OFFICE
CERTIFICATE OF CORRECTION

PATENT NO: 5,915,033
DATED: June 22, 1999
INVENTOR(S): Taichi Tanigawa, Hideo Shimizu, Takehide Hirabayashi and Akio Izumi It is certified that error appears in the above-identified patent and that said Letters Patent is hereby corrected as shown below:

In column 2, line 7, change "a" (second occurrence) to --σ--;

In column 5, line 35, after "sf" add period;

In column 6, line 33, change " $\Delta a = a\epsilon_1\theta, \Delta bs = f\epsilon_1\theta^2$ " to -- $\Delta a = a\epsilon_2\theta, \Delta bs = f\epsilon_2\theta^2$ --;
line 37, change " $\Delta a = 0, \Delta bs = f\epsilon_6\phi)$ " to -- $\Delta a = 0, \Delta bs = f\epsilon_6\phi$ --;

In column 7, line 10, change " $P=b\epsilon_1+\delta_3, Q=f\epsilon_2, R=f\epsilon_6, S=f\epsilon_1$ " to -- $P = b\epsilon_1 + \delta_3, Q = f\epsilon_2, R = f\epsilon_6, S = f\epsilon_5$ --;
line 66, change "As" to --Δs--;

In column 8, line 2, change "()" to --(j)--; and
line 55, change "σ=s⁻(bs+Δbs)" to --σ=s-(bs+Δbs)--.

Signed and Sealed this

Twenty-first Day of December, 1999

Attest:

Q. TODD DICKINSON

*Attesting Officer*   *Acting Commissioner of Patents and Trademarks*